Figure 1:
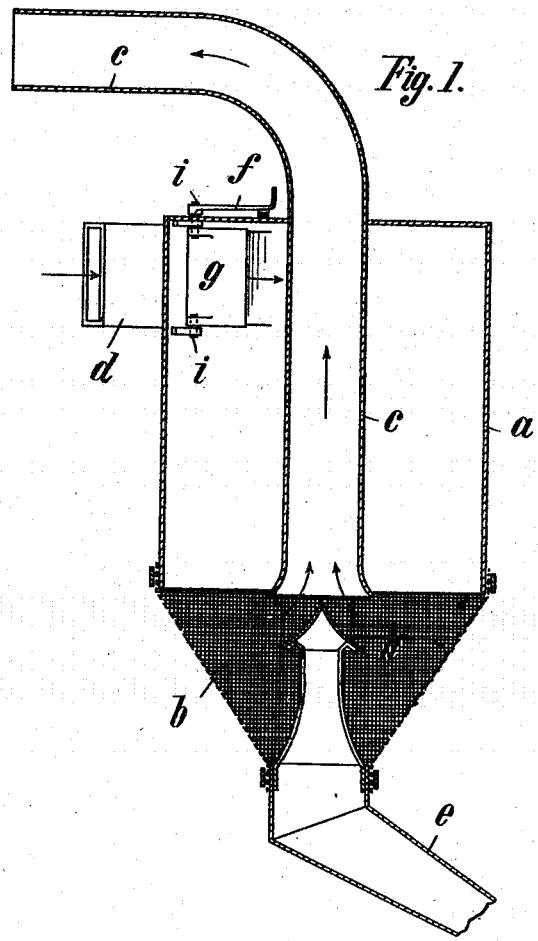

R. G. NEUMANN.
SIFTER FOR PULVERULENT MATERIAL.
APPLICATION FILED AUG. 25, 1905.

911,258.

Patented Feb. 2, 1909.

Witnesses.

Inventor.
Richard Gotthilf Neumann.

UNITED STATES PATENT OFFICE.

RICHARD GOTTHILF NEUMANN, OF WANDSBEK, NEAR HAMBURG, GERMANY, ASSIGNOR TO THE FIRM OF KAKAO-COMPAGNIE THEODOR REICHARDT, GESELLSCHAFT MIT BESCHRÄNKTER HAFTUNG, OF WANDSBEK, NEAR HAMBURG, GERMANY.

SIFTER FOR PULVERULENT MATERIAL.

No. 911,258.      Specification of Letters Patent.      Patented Feb. 2, 1909.

Application filed August 25, 1905. Serial No. 275,778.

*To all whom it may concern:*

Be it known that I, RICHARD GOTTHILF NEUMANN, a subject of the German Emperor, and resident of Wandsbek, near Hamburg, in the German Empire, have invented certain new and useful Improvements in Sifters for Pulverulent Material, of which the following is a specification.

The present invention relates to improvements in sifters for pulverulent material and more particularly to dust catchers of the cyclone-type and the like and has for its object to sift powdery or pulverulent material such as flour, cacao-powder and the like and to separate from the complete mass more or less fine matter according to desire.

The invention consists in arranging a turnable valve or flap on the inlet-opening and a hopper made of fabric pervious to air in the lower part of the sifter.

In the drawing is shown a sifter made according to this invention.

Figure 2:
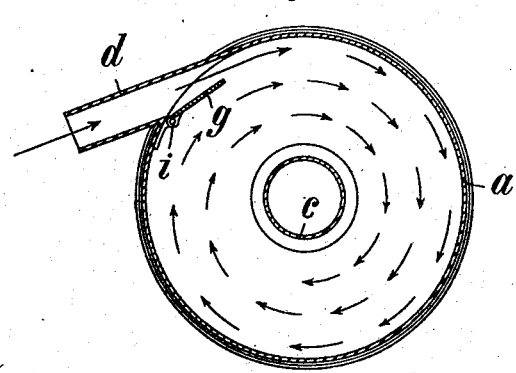

Figure 1 shows a vertical section of the sifter and Fig. 2 shows a horizontal section of the same.

The sifter has somewhat the appearance of a dust-catcher and consists of an outer cylindrical casing $a$ open at the bottom and provided with a central outlet pipe $c$ and an inlet pipe $d$ discharging into the casing in tangential direction. The lower end of the casing is connected to a preferably conical receiver $b$, which at its lower end is connected to the outlet-pipe $e$ for the coarser ingredients of the sifting-material.

At the mouth of the inlet-pipe $d$ there is inside of the sifting chamber a flap-valve $g$ attached to pivot-pins $i$, the upper one of which projects through the ceiling of the casing and is provided with a handle $f$ to adjust the valve $g$, the position of which decides the size of opening. The valve $g$ may be so positioned that only a very narrow slit is left, it is adjusted by means of the handle from outside according to the desired degree of fineness. The valve is arranged in such a manner, that the stream of sifting-material, entering tangentially into the upper part of the sifting chamber, is, after making one turn as is shown by arrows, deflected from the circle-path in such manner that it describes the line of an Archimedean spiral and at the same time moves in the line of a screw towards the receiver $b$, so that a counter acting disturbance of the newly entering current of air mixed with the pulverulent material and the current circulating in the chamber is effectively prevented. In this manner by the action of whirls, created thereby, the coarser ingredients separate from the finer lighter parts, which by aid of the cone $h$ below the mouth of the central outlet-pipe $c$ are the easier carried away by the streams of air, which are impelled to move towards the axis of the chamber and out through the pipe $c$ to the collecting place.

The conical receiver $b$ is made of a closely woven fabric, so that the coarser ingredients of the sifting material may slide down to the outlet pipe, without being prevented therefrom by the circulating or whirling currents charged with sifting material and without being forced through the fabric while the air itself partly passes through this fabric, thus reducing the pressure and allowing the sifting material to come to rest during the separation.

What I claim and desire to secure by Letters Patent is:

In a sifter for pulverulent material, an upper cylindrical casing having a tangential inlet, a flap valve controlling the inlet and projecting into the casing when open to control the quantity of admission, deflect by one face the incoming air toward the periphery and by the other face deflect the air that passes around the periphery toward the center, a central outlet lower than the inlet and a conical receiver of a fabric pervious to air to vent air from the receiver and decrease the carrying capacity of the air current, substantially as and for the purposes set forth.

RICHARD GOTTHILF NEUMANN.

Witnesses:
    MAX LEMCKE,
    HARRY RAECKNER.